May 15, 1928.
W. S. JACKSON
CLAMP FOR CONNECTER SPRINGS
Filed Dec. 27, 1921
1,669,829
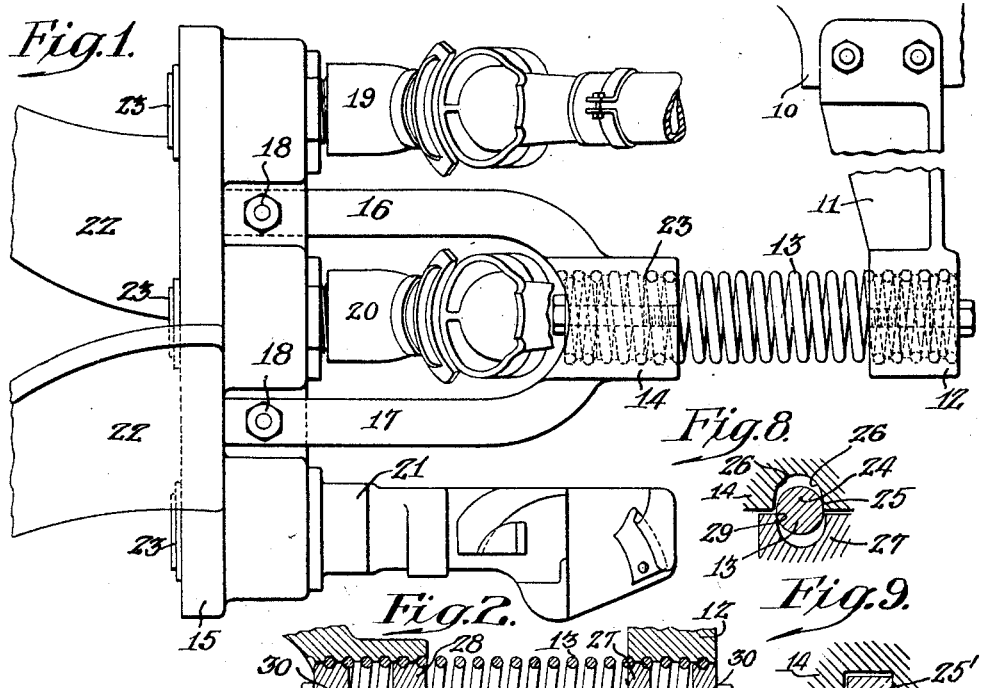
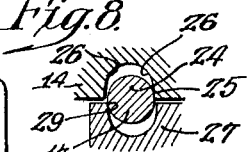
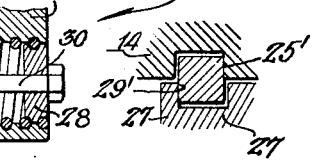
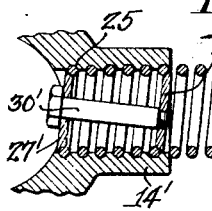
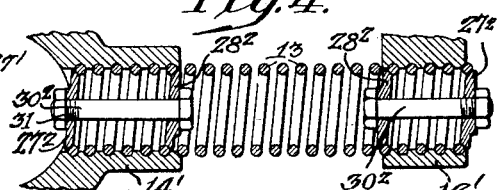
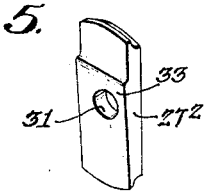
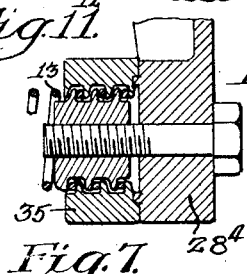
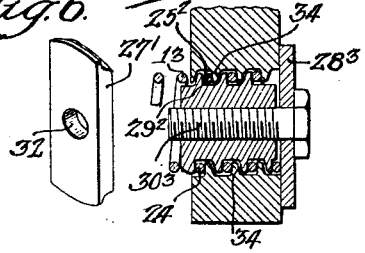
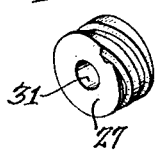

Patented May 15, 1928.

1,669,829

UNITED STATES PATENT OFFICE.

WILLIAM STEELL JACKSON, OF BALA, PENNSYLVANIA, ASSIGNOR OF ONE-HALF TO ELLISON EDWARD WORKMAN AND ONE-HALF TO EDWARD ARTHUR ROBINSON, BOTH OF MONTREAL, CANADA.

CLAMP FOR CONNECTER SPRINGS.

Application filed December 27, 1921. Serial No. 524,847.

My invention relates to holders for train connecters intended automatically to couple train pipes upon meeting ends of adjoining cars.

The main purpose of my invention is to clamp a helical spring member which holds the connecter from its bracket by longitudinal gripping action as distinguished from radial gripping action.

A further purpose is to clamp a spiral within a nut by an internal plug which is forced axially to give axial gripping between the threads of the spring and the threads of the nut.

Further purposes will appear in the specification and in the claims.

I have preferred to illustrate my invention by but one general form, having slight modifications in the form of internal plug, selecting a form and modifications thereof which are practical, efficient, convenient and inexpensive and which at the same time well illustrate the principles of my invention.

Figure 1 is a fragmentary side elevation of an automatic connecter to which my invention is applied.

Figure 2 is a fragmentary longitudinal section of the structure seen in Figure 1.

Figures 3 and 4 are sections corresponding to Figure 2 but showing slightly different forms of internal plug and thread.

Figures 5, 6 and 7 are perspective views of different forms of plug which may be used.

Figures 8, 9 and 10 are sections showing different types of thread and two kinds of spring.

Figure 11 is a section showing my invention applied in a slightly different clamping relation.

In the drawings similar numerals indicate like parts.

In the support of connecter heads from the connecter brackets it is quite desirable to use a spring to provide the support and at the same time to permit coarse adjustment of the distance between the parts. In fastening this spring to the connecter and the bracket respectively, reliance has previously been placed upon clamps engaging the exterior of the spring in radial compression, or clamping a turn or part of a turn of a spring against a fixed face. As distinguished from these, I purpose securing the coils of the spring within the nut in which the spring is supported by gripping the turns of the spring axially of the spring and also slightly compressing the intermediate spring length. I clamp the spring in an axial or nearly axial direction between an axially movable plug engaging the spring between its coils and the portions of the internal thread of the nut which extend within the coils of the spring.

Describing the figures of the illustrations, in explanation, and not in limitation:—

In Figure 1 I have shown a relatively fixed car member 10 which may be a part of the car coupling, supporting a bracket 11, whose lower portion 12 forms a nut. This nut supports one end of a spring 13 whose opposite end is supported in a corresponding nut 14 rigid with a coupler head 15.

The particular coupler head shown is supported from the nut by yoke arms 16 and 17. These arms are staggered from opposite ends and opposite sides of the head where they are secured by bolts 18. The coupler connections are shown at 19, 20 and 21 and the ears 22 give guiding engagement with corresponding coupler heads upon the meeting cars through flexible pipes (19', etc.) and couplers $19^2$, $20^2$ and $21^2$.

The present application is directed to the fastening of the spring, with or without provision for adjusting the spring support to alter the extent of projection of the head, and therefore is not restricted to any particular bracket or to any particular head. It is desirable that the coupler be provided with a fine adjustment by which to vary the projection from the head of the gaskets 23.

The nuts 12 and 14 (Figures 1 and 2) are alike in that they are provided with the inwardly facing threads 26 to receive the coils of the spring and that the shape of the threads is such as best shown in Figure 8, that the threads engage with the turns 24 of the spring at approximately their inner edges 25, being relieved at 26 from contact with the spring.

The plugs 27 and 28 are adapted to screw into the threads formed by the spring from either end, and to any desired extent, so that they may be spaced along the spring and one or both may be movable to clamp the spring. As shown in other figures, one of these may act as an abutment merely. The plugs may be placed very close together or well spaced as in Figure 2 at the discretion of the designer. It will be obvious that each one of the plugs 28 is effective as an anchorage or abutment for the pull of the bolt upon the other plug having an effect, so far as the other plug is concerned, similar to that of the abutment 28³ in Figure 10.

The threads upon the plugs are adapted to engage the turns of the spring near the outer edges of the threads as at 29 (Figure 8) so that clamping compression upon the spiral is everywhere substantially longitudinal of the spring.

The plugs are drawn together by bolts 30 passing through the one plug and threaded into the other.

In operation the spring is threaded into the bracket and the head is preliminarily or subsequently mounted upon the spring in the desired position. The plugs and bolts may be threaded into position before or after the mounting of the parts upon the spring. The bolts are then tightened to draw the plugs toward each other in the respective nuts, tightening the coils of the spring individually against the adjoining inner edges of the threads in the nuts and giving an extent of frictional engagement which may be increased to any extent desired by increasing the number of coils engaged by each nut or by increasing the extent of circumferential contact of each thread within the plug and nut with the coils of the spring. Maximum contact radially would be represented by the square thread and square spring section of Figure 9 in which the contacts are shown at 25' and 29'. Maximum contact circumferentially is represented by a cylindrical plug engaging continuously as distinguished from a strip or plate extending but part way about the thread of the nut.

In the form shown in Figures 3, 4, 5 and 6 a single turn of spring only is affected by the plug at each end and the plug is or may be restricted to a part of the turn. As thus seen, the plug becomes a plate or bar such as is shown in Figure 5 or Figure 6 and this plate may be threaded in from the end of the spring just as in the case of the plugs of Figure 2 before or after the spring is threaded into the nut 14' or 12' if the spacing of the coils of the spring be insufficient to permit the plate to be inserted from the side, as would ordinarily be the case.

The two plugs 27', 28', 27², 28², differ in the provision for taking care of the angularity of the plate plug with respect to the axis of the spring.

In Figure 3 the bolt 30' extends perpendicularly to the plate through the center. In Figures 5 and 6 one or both of the openings 31 and 32 is or are not located in the center of the plate but one at least is offset with respect to the center on account of the angular direction of the bolt with respect to the axis of the spring.

In Figure 4 the outer face 33 of the plate plug 27² is made perpendicular to the axis of the spring so that the openings 31' may be central and the bolts may be axial in position.

In these figures any type of thread may be used which is desired. The threads shown in Figures 3 and 4 are intended to correspond generally with the thread in Figure 8 in that opposing contacts upon the spiral, of the thread of the nut on one side and of the thread of the plug on the other, shall be chiefly or wholly in a line substantially longitudinal of the spring axis.

I recognize, however, that a part of the benefit of my invention could be obtained by the use of a thread in the nut fitting the general contour of the spring with a corresponding thread in the plug, or that United States standard threads could be used in the two.

In Figure 10 each of the threads in the nut and upon the plug is spaced from the next to permit both the spring and a portion of the thread upon the other to project within, so as to give axial grip of the spring directly upon the spring. In this case the threads may be perpendicular to the axis of the spring upon their gripping faces 25², 29² or may conform to the shape of the spring to any extent desired. In either case I prefer to slope the non-gripping sides 34 of the teeth to give maximum strength.

All of the clamping effect of my invention may be secured through the gripping of portions of the spring wholly or largely in an axial direction between the thread or threads of the nut and the thread or threads of the plug or that benefit can be obtained also by axial compression of the intermediate spring section causing the spring to expand against the intervening nut thread.

Where the gripping action of one clamp only is desired the other plug may be a mere plate or abutment, such as 28³ in Figure 10, applicable to any of my constructions, supporting the bolt at one end. A logical development of this form is shown in Figure 11 where the "abutment" is the bracket itself, the nut 35 a part of a clamp resting against the bracket, and the plug 28¹ a cooperating clamping member gripping the spring between it and the nut. Any shape of thread may be used and the bracket need not be bored large enough to let the spring extend into it unless this additional room for the end of the spring be desired. In that event the bore could extend part way through, or the bore extend all the way through, using an additional abutment like 28³.

It will be obvious that other variations of my invention may be made in view of my disclosures herein to include all or a part of the benefit of my invention and I purpose including herein all such variations which fall within the reasonable spirit and scope of my claims.

Having thus described my invention, what I claim as new and desire to secure by Letters Patent is:—

1. In a train pipe connecter, a bracket member and a connecter head member, a spring adapted to support the connecter head from the bracket and a clamp joining the spring and one of the members comprising a nut engaging one end of the spring and an exteriorly threaded plug and a bolt therefor and connections forcing the plug axially of the spring with respect to the nut to grip the spring between the thread of the plug and the thread within the nut.

2. In a train pipe connecter, a bracket member and a connecting member, one of them interiorly threaded, a spring adapted in operation to support the connecter member from the bracket member and fitting the thread, and a clamp joining the spring and said threaded member, said clamp comprising a bolt, and a plug threaded to engage the interior of the spring as a thread and moved by the bolt axially of the spring, whereby the spring is clamped between the two threads.

3. In a train pipe connecter support, a nut, a spring adapted to engage the interior thread of the nut, a longitudinally extending threaded clamp, part of which at least lies inside the nut and whose thread engages the spring and means for tightening the clamp axially of the spring.

4. In a train pipe connecter, a connecter part, a thread therein, a spring engaging therewith and a clamp for tightening the spring within the part, comprising a pair of opposed plugs inside the thread of the spring and a bolt for tightening the one plug with respect to the other plug to force the spring against the interior of the nut to tighten the spring.

5. In a train pipe connecter, a connecter part carrying a nut and a spring adapted to engage with the radially interior part of the thread of the nut, in combination with a threaded plug within the spring engaging the threads of the spring along the radially exterior part of the plug threads and means for forcing the plug axially of the spring to clamp the spring between opposing thread portions of nearly the same diameter.

6. In a train pipe connecter, a spring, a connecter member into which the spring is threaded, and a threaded clamp adapted to hold the spring to the connecter member, comprising, with the member, a threaded plug adapted to be inserted within the member and spring and means for forcing the plug axially of the spring to cause the spring to be gripped between the threads of the member and the threads of the plug in a direction substantially longitudinal of the spring.

7. In a fastening for holding a spring within a nut to which one of the ends of the spring is to be secured in an automatic train connecter, the combination of the spring, the nut within which one end of the spring is threaded, a threaded plug engaging the spring, and means for forcing the plug lengthwise of the spring to grip the spring between the outer parts of the thread of the plug and inner parts of the thread of the nut.

8. In a fastening for holding a spring within a nut to which one of the ends of the spring is to be secured in an automatic train connection, the combination of the nut within which the spring is adapted to be placed, a spring having an end fitting into the nut and having the contact with the nut generally along that part of the nut threads of lesser diameter, a threaded plug and means for tightening the threads of the plug against the spring to clamp the turns of the spring between the plug and nut in a direction substantially longitudinal of the spring.

9. In a fastening for holding a spring within a nut to which one of the ends of the spring is to be secured in an automatic train connecter, the combination of a nut, a spring threaded thereinto and internal means for compressing the spring lengthwise, to tighten it against the nut.

10. In a fastening for holding a spring within a nut to which one of the ends of the spring is to be secured in an automatic train connecter, the combination of a nut, a spring threaded thereinto, a pair of plugs engaging the interior of the spring and a bolt forcing the nuts together to clamp the spring between the plugs and the nut.

11. In an automatic train pipe connecter, a spring, a member having a threaded portion therein of uniform thread diameter forming a nut for the spring and leaving exposed upon the interior a portion of the spring in the form of a thread, a plug entering the thread defined by the interior of the spring and engaging the interior of the spring to force the spring against the nut, a bolt operating the plug and a device against which the bolt is adapted to engage to limit its movement whereby it becomes effective to force the spring against the nut.

WILLIAM STEELL JACKSON.